Dec. 30, 1930.  F. O. VAUGHN  1,786,970
BRAKE MECHANISM
Filed Jan. 23, 1929  2 Sheets-Sheet 1
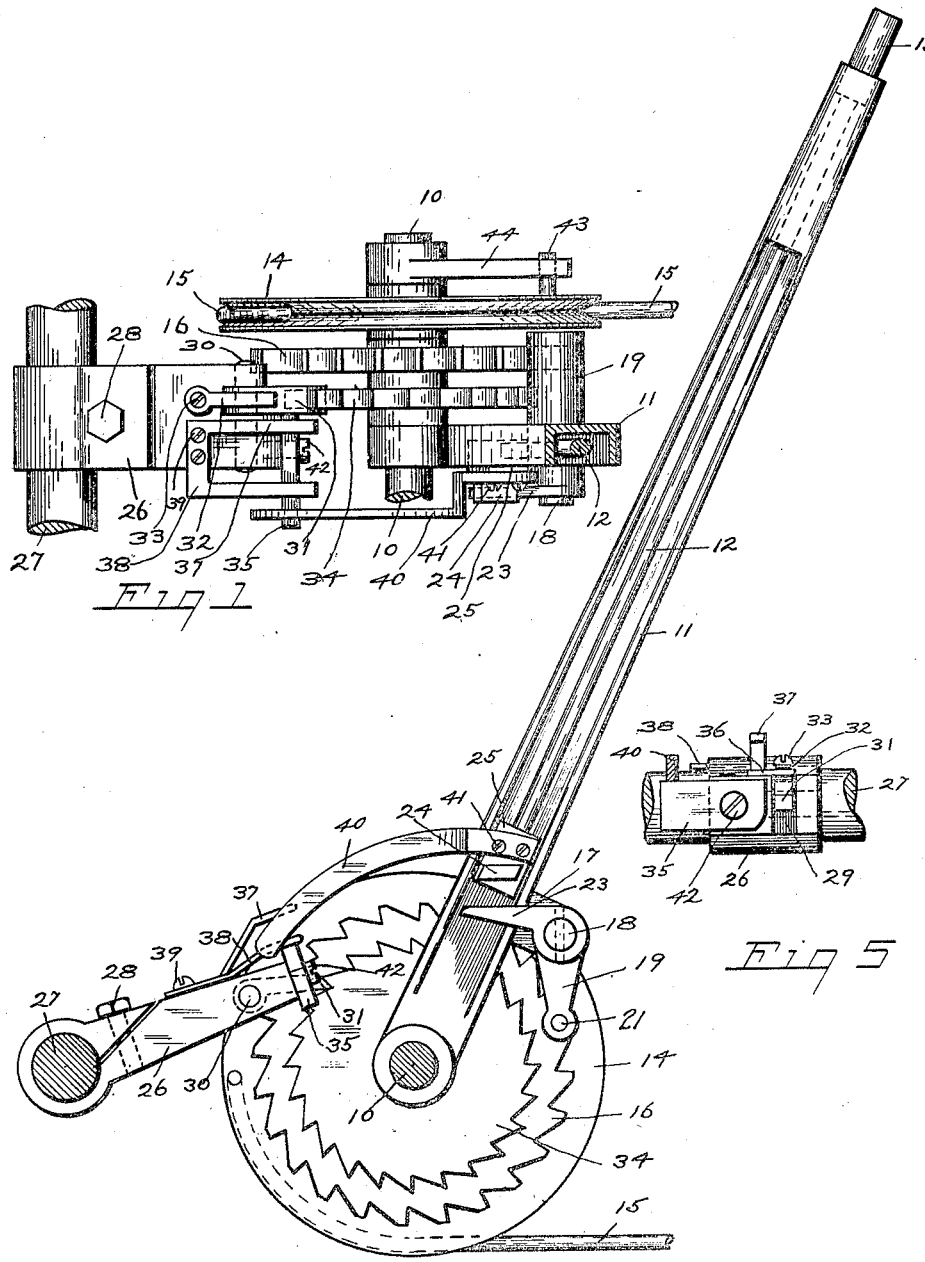
Inventor
Frank O. Vaughn
By his Attorney
John J. Thompson Dec. 30, 1930.    F. O. VAUGHN    1,786,970
BRAKE MECHANISM
Filed Jan. 23, 1929    2 Sheets-Sheet 2
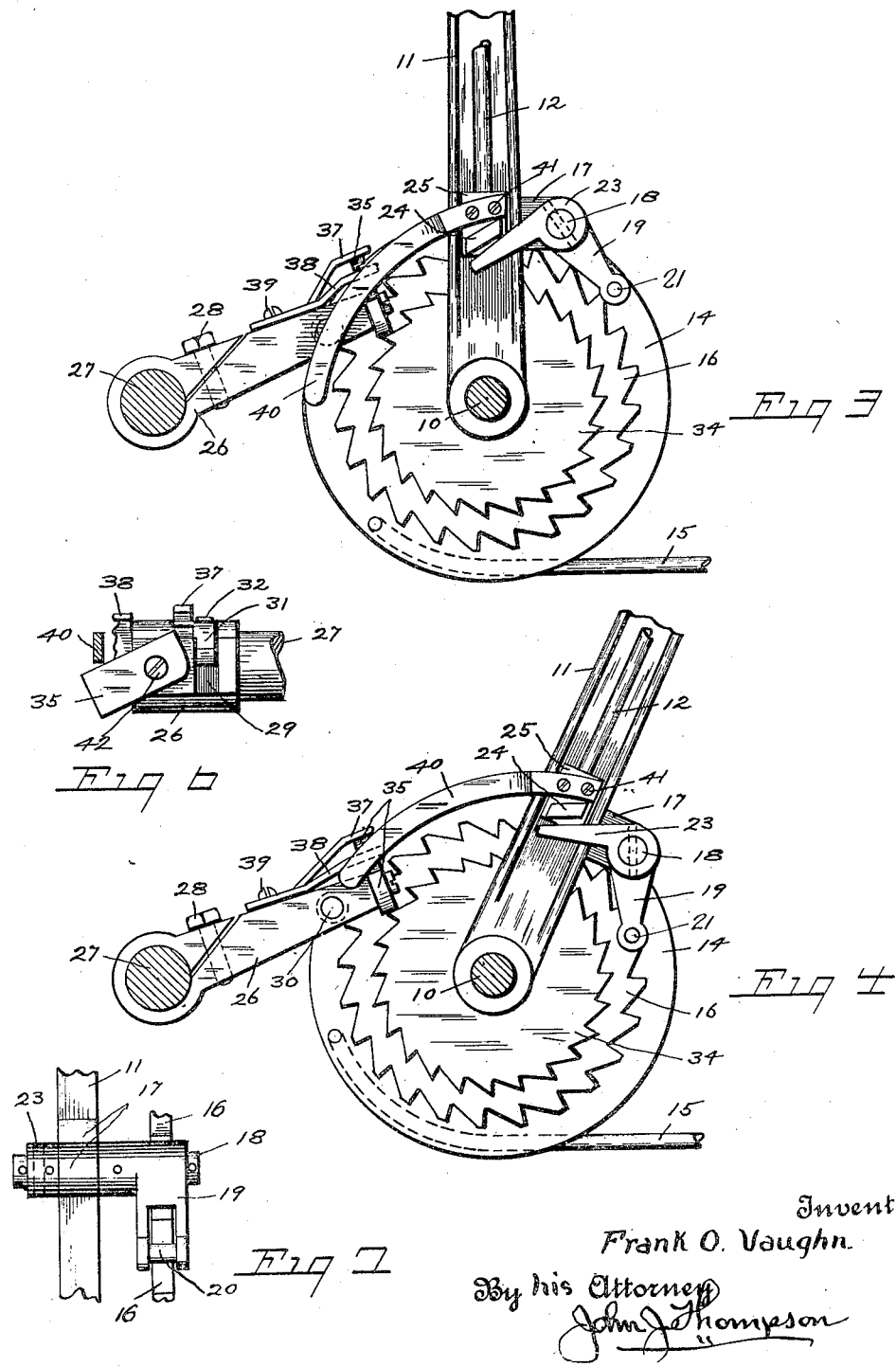
Inventor
Frank O. Vaughn.
By his Attorney
John J Thompson Patented Dec. 30, 1930

1,786,970

UNITED STATES PATENT OFFICE

FRANK O. VAUGHN, OF POUGHKEEPSIE, NEW YORK

BRAKE MECHANISM

Application filed January 23, 1929. Serial No. 334,392.

This invention relates to a brake mechanism of that class employed on automobiles and other vehicles, for applying the brakes to the wheels, for retarding or stopping the vehicle.

In the usual design of hand operated brake as now in use on automobiles, a hand lever has its lower end connected to suitable brake operating rods, and the lever is retained in position after being moved, by a pawl coacting with a notched sector, but there is no fine adjustment provided, and in many cases it is found that the pawl or latch has to be engaged with a tooth of the sector that either applies the brakes too much or not enough.

Also as the brakes become worn from use or stretch of the rods, there is no automatic means provided for taking up this stretch, but the rods or bands must be adjusted at the wheels.

The object of the present invention is to provide means whereby through the action of the hand lever any tension may be placed upon the brake rods or cables thus applying the brakes with any degree of tension desired from a free position to a locking engagement.

Another object of the invention is to provide means for the automatic adjustment of the brake tension at all times without varying the length of the cables or rods.

A still further object is to apply the brakes at any time without having to make any adjustment in the length of the cable or rods.

With these and other objects in view, my invention consists in certain construction and combination of parts as will hereinafter be fully described and claimed in the annexed specification and fully illustrated in the accompanying drawings which form a part hereof and in which like figures of reference refer to corresponding parts in all of the views, but it is understood that slight changes may be made without departing from the spirit of the invention.

In the drawings:

Figure 1 is a partial plan view of the device.

Figure 2 is a side elevation of the same, showing it in position where the brake is fully applied.

Figure 3 is a similar view, but showing the position of the several parts when the retaining pawl is released.

Figure 4 is a similar view, but showing the device in a fully released position.

Figure 5 is a partial end view of locking or retaining device, showing the same with the retaining pawl in its engaging position.

Figure 6 is a similar view of the same, but in its open or non-engaging position as shown in Figure 4.

Figure 7 is a partial detail view of the operating or take up pawl.

Referring to the drawings, the usual brake lever mounting shaft 10, is indicated; this shaft in most automobiles extending from side to side of the chassis frame, but the brake lever and other mechanism may be mounted upon suitable studs projecting from the transmission casing, and it is understood that this shaft is non-rotatable as here employed.

Mounted upon said shaft 10, is the lower end of a hand lever of the usual form 11, provided with a latch operating rod 12, having its upper end attached to the thumb plunger 13 which is actuated by a spring within said handle in the usual manner to normally raised position; said lever 11, having a free swing through a predetermined arc.

Adjacent to the pivoted end of said hand lever 11, and freely rotatably mounted on the shaft 10 is placed the brake actuating device, which comprises a sheave wheel 14 to which is secured the end of a cable 15, the other end of which is attached to the brakes or their direct operating levers in the usual way, or a rod may be used in place of the cable if so desired.

For imparting a rotary movement to said wheel 14 by a reciprocating movement of the hand lever 11, to wind the cable 15 thereon to tighten the same and exert tension on the brakes, there is provided a ratchet wheel 16 adjacent to the sheave wheel 14 and secured thereto in some suitable manner.

The hand lever 11, adjacent the ratchet wheel 16, is provided with a bearing bracket 17, within which is mounted a short shaft 18 upon one end of which is secured a depending bifurcated arm 19, which carries a roller 20 mounted on a shaft 21 for engagement with the teeth of the ratchet 16 to act as a pawl for engaging said teeth and rotating said wheel 16 as the hand lever 11 is reciprocated; engagement between said roller 20 and the ratchet being normally retained by the weight of said arm 19 and the action of a spring 22.

On the other end of the shaft 18 is secured an arm 23 in close relation to the side of the hand lever 11 and in the path of a lug 24 which is formed on the side of a block 25 which is slidably mounted in the hand lever 11 and attached to the lower end of the rod 12 and operated thereby.

For preventing the backward movement or rotation of the sheave wheel 14 as it is being rotated to tighten the cable 15, there is provided an arm 26 which is rigidly clamped on a suitable shaft or boss 27 which forms a part of the automobile such as the gear or transmission casing, by the clamp screw 28, and the forward end of this arm is provided with a vertical slot 29 and a transverse pin 30, and within said slot 29 and pivoted on said pin 30 is a pawl 31, which is held under pressure by a spring 32 secured by a screw 33 to said arm 26.

Said pawl 31 is adapted to engage the teeth of a second ratchet wheel 34 which is mounted on the shaft 10 and secured to the ratchet wheel 16 and sheave wheel 14, which comprise the rotary unit; the teeth of the ratchet 34 being of finer pitch than those of the ratchet 16 so that a finer adjustment of the cable 15 may be made than could be done if the ratchet 16 were employed both as an operating ratchet and holding or retaining ratchet, and it will thus be seen that in the operation attending the tightening of the brakes that by a reciprocating movement of the hand lever 11, the roller 20 will move the ratchet 16 forward to rotate the sheave wheel 14, and that the pawl 31 will in coaction with the ratchet 34 retain and hold all of such movement.

In the releasing of the brakes, the pawl 31 must be first raised out of contact with the teeth of the ratchet 34 and this is accomplished in the following manner.

To the outer end of the arm 26 and adjacent to the slot 29 is pivoted a transverse arm 35, the inner end of said arm projecting under a lug 36 which is formed on the pawl 31 and the outer end of said arm projecting beyond the side of the arm 26, while above said arm 35 are secured to the arm 26 two stops 37 and 38 by the screws 39, thus limiting the upward swing of each end of said arm 35.

For operating this arm 35 there is provided a curved arm 40 which is attached to the block 25 by the screws 41, and this arm is of such a length and shape as to be at all times above said arm 35 and capable of being brought into engagement therewith by the downward movement of said block 25 as actuated by the thumb piece 13.

Now referring to Figure 4 of the drawing, it will be seen that as the block 25 is pushed down by the rod 12, that the curved arm 40 will contact with and press down the end of the transverse arm 35, thus swinging the same on its pivot point and raising its inner end to contact with the lug 36 on the pawl 31 and raise the same out of engagement with the teeth of the ratchet 34, but it will be noted that the ratchets are still prevented from backward rotation by the engagement of the roller 20 with the teeth of the ratchet 16.

Then by a further downward movement of the block 25, the projection or lug 24 on the block 25 will as shown in Figure 3, contact with and push down on the arm 23, which will in turn swing the arm 19 and roller 20 clear of the teeth of the ratchet 16, thus freeing both of the ratchets and allowing the same to revolve backward to release the tension on the brake cable 15.

It will thus be seen that the cable 15 may be wound on the sheave wheel 14 by the action of the ratchets and pawls as operated by the hand lever to exert any required tension on said cable, and also to compensate for all stretch, and adjustment as to length.

For preventing excessive rotation of the cable tightening unit in a backward direction when the same is released, there is provided a stop pin 43 secured to the side of the wheel 14, and in the path of said pin is adjustably secured on the shaft 10, a stop arm 44 in some suitable manner.

Having thus described my invention, what I claim as new and desire to secure by Letters Patent, is:

1. A brake mechanism comprising in combination, a cable winding means and a hand lever adapted to be reciprocated to rotate said winding means, a cable tightening ratchet secured to said cable winding means, a retaining ratchet also secured thereto, means carried by said hand lever for rotating said cable tightening ratchet comprising an arm pivoted to said hand lever, a roller mounted in said arm and adapted to be normally in engagement with the teeth of said cable tightening ratchet, means for preventing the backward rotation of the retaining ratchet, and means carried by said hand lever for rendering one or both of said ratchet operating means inoperative.

2. A brake mechanism comprising in combination with a brake operating means, comprising in part a cable tightening unit having a sheave wheel attached to said cable and two ratchets, and a hand lever adjacent thereto for rotating said wheel, means carried by said hand lever for rotating said cable tightening unit during the forward movement of said hand lever, means mounted adjacent to said cable tightening unit for preventing the backward rotation of the same, comprising an arm, a retaining pawl mounted therein and normally in engagement with the teeth of one of said ratchets, means carried by said hand lever for disengaging said retaining pawl from said ratchet during the backward movement of said lever and by a further movement of said means to disengage both of said pawls to allow of the backward rotation of said cable tightening unit.

3. A brake mechanism comprising in combination a shaft, a drum secured thereon, an operating ratchet wheel secured to said shaft and adapted to rotate said drum, a retaining ratchet wheel also secured to said shaft and adapted to rotate with said drum, a hand lever pivoted to said shaft and freely movable thereon, a pawl carried by said hand lever and adapted to engage said operating ratchet wheel to rotate said drum by the forward movement of said hand lever, an arm mounted in a rigid manner adjacent to said shaft and in parallel relation therewith and spaced therefrom, a pawl carried by said arm and adapted to engage with said retaining ratchet wheel, a push rod mounted in said hand lever, a lug mounted thereon and adapted to engage with and release the operating pawl, an arm also mounted on said push rod and adapted to engage with the retaining pawl to operate the same.

In testimony whereof I affix my signature.

FRANK O. VAUGHN.